2,984,658

OLEFIN POLYMERIZATION WITH CATALYST OF WATER-TREATED TITANIUM COMPOUND AND AN ALKYL ALUMINUM COMPOUND

Gerhard Seydel, Bad Soden (Taunus), and Claus Beermann, Ernst Junghanns, and Heinz-Joachim Bahr, Frankfurt am Main, Germany, assignors to Farbwerke Hoechst Aktiengesellschaft vormals Meister Lucius & Bruning, Frankfurt am Main, Germany, a corporation of Germany No Drawing. Filed Apr. 2, 1957, Ser. No. 650,064

Claims priority, application Germany Apr. 12, 1956

11 Claims. (Cl. 260—94.9)

The present invention relates to a process for preparing polyolefins.

It is known to polymerize lower olefins with mixtures of polymerization initiators consisting of compounds of the metals of the subgroups of groups IV, V and VI of the periodic table, preferably of titanium, and organometallic compounds, especially of aluminum, at moderate pressures and temperatures in order to form high molecular products being especially suitable as starting material for technical commodities. Processes of this kind are called low pressure polymerization processes.

According to U.S. patent application Ser. No. 553,412 filed on December 16, 1955 in the name of Roderich Graf et al. for: Process for Preparing High Molecular Polyethylenes, it has been proposed advantageously to isolate from the mixtures of polymerization initiators the salts of a lower valence stage of, for instance, titanium formed by reacting, for example, tetravalent titanium salts with alkyl aluminum halides, which salts are insoluble in hydrocarbons, adding said salts discontinuously or continuously to the polymerization mixtures and activating them as desired with organometallic compounds such as alkylaluminum chlorides. In this way polymers of high molecular weight are often formed.

In consideration of the sensitivity of the catalysts used in this process against hydrolyzing effects one should exclude as far as possible all traces of moisture in the apparatus, the solvents and the monomers.

For many industrial applications it is desirable to prepare polymers having lower average molecular weights.

Now we have found that lower olefins having 2–4 carbon atoms can be polymerized according to the low pressure polymerization process by means of a catalyst mixture consisting of compounds of the elements of the subgroups of groups IV, V and VI of the periodic table and organometallic compounds of the alkaline, earth and rare earth metals by adding small amounts of water to the polymerization mixture. For the process according to the invention all dispersing agents mentioned in the aforesaid patent application may be used as well as all steps which are applied in the known low pressure polymerization processes for olefins.

For the industrial utilization of the process according to the invention it is immaterial whether the water content of the substances used in the polymerization (solvent, monomer) is controlled and, if desired, adjusted in a manner that the amount of water required for an optimum effect of the catalysts is present in the polymerization mixture or whether this amount of water is added to the salts of titanium insoluble in the polymerization medium prepared according to the above mentioned patent application, prior to their application as polymerization catalysts.

The required amount of water for activating according to the process of the present invention is situated below 8 mol percent, preferably between 0.5 and 5 mol percent calculated on the salts of the subgroups of groups 4 to 6 for example titanium of low valency, insoluble in the polymerization medium. In the case the process is performed in the described manner a maximum effect can be obtained. The polymers which are formed in this manner at an elevated polymerization rate have reduced viscosities (as measurement for the molecular weight) which are within the industrially desirable limits.

The following examples serve to illustrate the invention but they are not intended to limit it thereto.

EXAMPLE 1

The first indications relate to a polymerization process in the absence of water in order to establish a comparison. A dispersing agent consisting for example of aliphatic saturated hydrocarbons having a boiling range of 80–220° C. which is suitably freed of traces of dissolved oxygen and water (storage, boiling or distilling over drying agents in a pure nitrogen atmosphere) and which dispersing agent has been introduced under a current of purest nitrogen into a polymerization unit is saturated with ethylene which has also been freed of traces of oxygen and moisture by a treatment with drying agents and a dilute solution of an organometallic compound in a hydrocarbon. In the so prepared dispersing agent is suspended titanium trichloride likewise obtained in an oxygen- and water-free dispersing agent with superposition of purest nitrogen according to the process of aforesaid patent application S.N. 553,412. The dispersing agent has previously been heated to the desired polymerization temperature, for example to 60° C. When dosing, the apparatus for the preparation of the titanium trichloride is directly connected with the polymerization unit. Simultaneously with the titanium trichloride there is added to the dispersing agent diethylaluminum monochloride in an amount such that the molar ratio of titanium/ aluminum is from 1–2:1. The polymer separates at once. By introducing additional ethylene free from oxygen and moisture the gas pressure is constantly kept slightly above normal pressure. The absorption rate of ethylene increases within 30–60 minutes to a value depending on the concentration of titanium trichloride and the molar ratio of titanium/aluminum (cf. Table 1).

TABLE 1

*Polymerization rate of ethylene with titanium trichloride and diethylaluminum monochloride with the exclusion of oxygen and moisture at 60° C.*

| Titanium tri-chloride (mmols per liter) | 2 | 4 | 8 | 16 | 24 | 32 |
|---|---|---|---|---|---|---|
| diethylaluminum monochloride (mmols per liter): | | | | | | |
| 2 | 1.7 | | 6.7 | | | |
| 4 | | 7 | 9.5 | | | |
| 8 | | | 18 | | | |
| 12.3 | | | | 33.7 | | |
| 18.4 | | | | 22 | 41.5 | |
| 24.5 | | | | | | 66 |

NOTE.—The figures represent grams polymer per liter of dispersing agent per hour.

When such an amount of polymer is formed that the suspension cannot be stirred uniformly any more the polymerization is finished by the addition of a little acetone or butanol. The reduced viscosities of the polymers finished in known manner determined in solutions of 0.5% strength in tetrahydronaphthalene as a measurement for the degree of polymerization are in all cases near and far above 50.

The following indications relate to the polymerization process according to the present invention.

In the above-mentioned anhydrous dispersing agent water is dissolved to saturation (25 mg./l. at 20° C., 125 mg./l. at 60° C.). To this dispersing agent titanium trichloride is added in suitable concentrations, for example 8–10 mmols per liter; the titanium trichloride has been prepared according to the above-mentioned patent application and the above indications with complete exclusion of oxygen and moisture. The suspension, under an atmosphere of purest nitrogen, is stirred for 2 hours at the desired polymerization temperature, for example at 60° C. Then the nitrogen is replaced by ethylene and diethylaluminum monochloride in a molar ratio titanium/aluminum of 1:0.5–1 is added in one portion or uniformly during the polymerization. After a short time the polymerization starts. In the case the water used amounts to between 2 and 80 mmols per mol of titanium trichloride the polymerization rate increases to values which are partially far above the values indicated in Table 1. A polymerization rate of 100–130 g. of polymer per liter of dispersing agent an hour is attained in the case the quantity of water amounts to 5–50 mmols per mol of titanium trichloride. The polymers formed at high polymerization rate and worked up after the polymerization in known manner have reduced viscosities between 2 and 6.

EXAMPLE 2

Gaseous ethylene is saturated in a suitable manner with water vapor. By mixing two currents of gaseous ethylene, one of which is dry and the other charged with a known amount of water vapor, an ethylene current is prepared with any known water content. The ethylene thus charged with small amounts of water vapor is used in the manner described above for the polymerization. The water content of ethylene is controlled in a manner that the polymerization rate attains values of 50 to 100 g. per liter of dispersing agent an hour. Polymers are obtained having reduced viscosities between 3 and 6.

EXAMPLE 3

To titanium trichloride prepared according to the aforesaid patent application and to Example 1 with complete exclusion of oxygen and moisture in the form of a concentrated, for example about 1–2 molar suspension in the said dispersing agent very small quantities of water are added in the form of water vapor, while stirring the dispersion. This addition is effected by introducing nitrogen which is free from oxygen and feebly charged with water vapor. The addition takes place in such a slow manner that the suspended titanium trichloride uniformly reacts with the water vapor. The treatment is finished when the titanium trichloride has attained its optimum effect as a catalyst for the polymerization of ethylene. The improvement of the catalytic effect of titanium trichloride is controlled by polymerization tests with small amounts of the portion treated with water. The titanium trichloride thus formed with traces of water is used in known manner for the polymerization of ethylene.

Polymers are obtained having reduced viscosities between 2 and 6.

While the working examples illustrate the use of diethyl aluminum monochloride as the alkyl aluminum component, it is evident from the disclosure of co-pending application Serial No. 553,412 that many other organoaluminum compounds may be used in applicants' process. These include trialkyl aluminum compounds, dialkyl aluminum monochlorides, and monoalkyl aluminum dichlorides. Suitabe alkyl groups are methyl, ethyl, propyl, butyl, isobutyl, and amyl groups, as well as groups containing 6 or more carbon atoms. Generally, the low molecular alkyl groups are preferred. Mixtures of the said organo-aluminum compounds, particularly of dialkyl aluminum monochlorides and monoalkyl aluminum dichlorides (known as alkyl aluminum sesquichlorides) may, of course, also be used.

Moreover, while the working examples illustrate the use of titanium trichloride as a reduced titanium salt, it is evident from the disclosure of Serial No. 553,412 that other trivalent titanium compounds would be equally operative. While the working examples in Serial No. 553,412 disclose the preparation of titanium trichloride as a reduction product of TiCl$_4$ (Examples 1–8, 15 and 16), they also disclose the preparation of trivalent titanium compounds by the reduction of:

(a) titanium dichloride diacetate (Example 9);
(b) titanium dichloride diacetyl acetonate (Example 10);
(c) titanium dichloride dibutylate (Example 11);
(d) titanium monochloride triethylate (Example 12);
(e) titanium tetraethylate (Example 13); and
(f) titanium tetrabutylate (Example 14).

We claim:

1. In a process of polymerizing ethylene in the presence of a catalytic amount of a two-component catalyst system comprising titanium trichloride and diethyl aluminum monochloride, the improved method of accelerating the polymerization reaction by treating said titanium trichloride with 0.5–8 mol percent of water based on the weight of titanium trichloride, and activating the water-treated catalyst compound during polymerization by the addition thereto of said diethyl aluminum monochloride.

2. Process of claim 1 wherein the titanium trichloride is dispersed in a medium containing said quantity of water.

3. Process of claim 1 wherein the titanium trichloride is treated with water during polymerization by introducing water vapor in admixture with the ethylene monomer.

4. Process of claim 1 wherein the titanium trichloride is treated with water by introducing water vapor into a hydrocarbon dispersion of titanium trichloride, stirring the dispersion while introducing nitrogen thereto, and continuing the addition of water vapor and nitrogen until the suspended titanium trichloride has reacted with the water vapor.

5. Process of claim 1 wherein the titanium trichloride is treated with water by adding the titanium trichloride to a hydrocarbon dispersing agent having water dissolved therein, maintaining a pure nitrogen atmosphere over the suspension, and stirring the suspension for a time sufficient to complete the reaction between the titanium trichloride and the water.

6. Process of claim 5 wherein the nitrogen is replaced by ethylene, and diethyl aluminum monochloride in a molar titanium/aluminum ratio of 1:0.5–1 is added during polymerization.

7. In a process of polymerizing a hydrocarbon α-monoolefin of 2 to 4 carbon atoms in the presence of a catalytic amount of a two component catalyst system comprising (1) a reduction product of a titanium salt and (2) an alkyl aluminum compound, the improvement comprising accelerating the rate of polymerization by pretreating said reduction product of a titanium salt with 0.5 to 8 mol percent of water, based on the weight of said reduction product, and activating the water-treated catalyst compound during the polymerization by the addition thereto of said alkyl aluminum compound.

8. The process of claim 7 wherein said alkyl aluminum compound is added in one portion during polymerization.

9. The process of claim 7 wherein said alkyl aluminum compound is added to the reaction mixture at a uniform rate during polymerization.

10. The process of claim 7 wherein said reduction product is reacted with water prior to polymerization, and an inert gas is swept over the resulting dispersion, after which the olefin is introduced.

11. In a process of polymerizing a hydrocarbon α-monoolefin of 2 to 4 carbon atoms in the presence of a catalytic amount of a two-component catalyst system comprising (1) titanium trichloride and (2) an alkyl aluminum halide, the improvement accelerating the rate of polymerization by treating said titanium trichloride with 0.5 to 8 mol percent of water based on the weight of said titanium trichloride, and activating the water-treated catalyst compound during the polymerization by the addition thereto of said alkyl aluminum halide.

References Cited in the file of this patent

UNITED STATES PATENTS 2,699,457    Ziegler et al. _____ Jan. 11, 1955

FOREIGN PATENTS 533,362    Belgium _____ May 16, 1955